Nov. 15, 1960

R. ROSEBROOK 2,960,071

MACHINE TOOL CONTROL

Filed May 26, 1958

INVENTOR.
ROY ROSEBROOK
BY
D. Gordon Angus
ATTORNEY.

United States Patent Office 2,960,071
Patented Nov. 15, 1960

2,960,071

MACHINE TOOL CONTROL

Roy Rosebrook, Montebello, Calif., assignor, by mesne assignments, to Banstrom Industries, Inc., Los Angeles, Calif., a corporation of Connecticut Filed May 26, 1958, Ser. No. 737,871

5 Claims. (Cl. 121—41)

This invention relates to numerical control of machine tools, and in particular to a feed-back system for governing the relative movements of two elements of such a machine tool along an axis.

In the control of machine tools such as mills for reproducing parts with intricate contours, it is customary to provide by means of a punched or magnetic tape a series of impulses which provide signals for causing the machine tool elements to move through distances which are proportional to the number of these impulses. An individual control means for providing and responding to such signals is customarily provided for each axis being controlled.

It is possible to use such signals to directly turn a lead screw and shift the table of a milling machine if desired, but such an arrangement generally gives rather crude results, because a motor with sufficient power to turn a power screw generally does not have sufficiently fine control to move the table through only a very small incremental distance, such as 0.0005".

Accordingly, it has been suggested that the signal impulses be used to operate a servo-motor, such as a stepping switch, or a pair of opposed synchronous motors, to turn a small, lightly-loaded worm which in turn actuates a servo valve for controlling the application of power to the machine tool for shifting the machine tool element. Two systems of this type are shown in the copending applications of Ray Rosebrook, Serial No. 642,282 filed February 25, 1957, now Patent Number 2,897,788, entitled "Servo Control for Rack Mechanism," and Serial No. 668,650, filed June 28, 1957, now Patent Number 2,910,967, entitled "Numerically Controlled Machine Tool."

Systems in accordance with the above co-pending applications have customarily utilized a signal shaft, which carries a worm that meshes with a worm gear, the worm gear being rotated in response to relative movement of the machine tool elements. When the worm is rotated by turning the signal shaft, it actuates a servo valve which controls movement of a machine tool element, and the resulting movement of the machine tool elements tends to return the servo valve to a null condition.

The feed back system just described has worked well in practice, but has had several practical disadvantages. One principal disadvantage lies in the high cost of lead screws, racks and gears having the accuracy necessary to control machine tool movements to a few tenths of one thousandth of an inch (0.0001") over a total machine movement of perhaps five feet. Another practical disadvantage has resided in the necessity of operating such machines at substantially constant temperatures, because, when a rack gear is utilized, for example, to drive the worm gear, a turn of the worm gear or any gear meshing with the rack always moves the rack or machine tool element by a distance determined by the number of teeth which passed through engagement, regardless of the spacing between the teeth. Accordingly, when the machine tool element expands and with it its rack, the distance the table moves changes, but the number of gear teeth involved does not change. Then the manufactured part is inaccurate because the feed-back circuit does not convey information as to table distance traveled, but rather as to a number of teeth engaged, and the spacing between the teeth can vary.

It is an object of this invention to provide a feed-back system for numerically controlled machine of the above type which is able to utilize an inexpensive continuous surface, such as a rail or a flexible tape, for example, instead of the expensive racks and lead screws which have been required in previously known machines of this type.

An additional object of this invention is to provide a feed-back system which is substantially insensitive to temperature change, and which provides its feed-back signal as a substantially invariable function of distance moved by the machine tool elements.

This invention is carried out in combination with a machine tool which has two elements which can be relatively shifted along an axis. Customarily a fluid motor, such as a piston and a cylinder combination, or a gear motor, is connected between the two machine tool elements so that operation of the motor moves the elements relative to each other. A servo valve having a null position and two operative control positions is connected in fluid lines leading to said fluid motor, so that the motor is held inoperative when the valve is in its null position and may be operated in either direction, depending upon which of the operative control positions the valve is placed in.

In addition, a servo motor which turns through angular increments which are proportional to the desired axial increments of movement of the machine tool elements, is connected to and turns a signal shaft which bears a worm. This signal shaft is linked to the said servo valve and meshes with a worm gear. When the signal shaft is turned, it shifts the position of the servo valve, which in turn operates the fluid motor, and relatively shifts the machine tool elements. A member having a continuous surface is attached to one of said elements, and is linked through its surface to part of the servo valve so that relative movement of the machine tool element tends to restore the servo valve to a null position.

The above and other features of this invention will be fully understood from the following detailed description and the accompanying drawings, of which:

Figure 1:
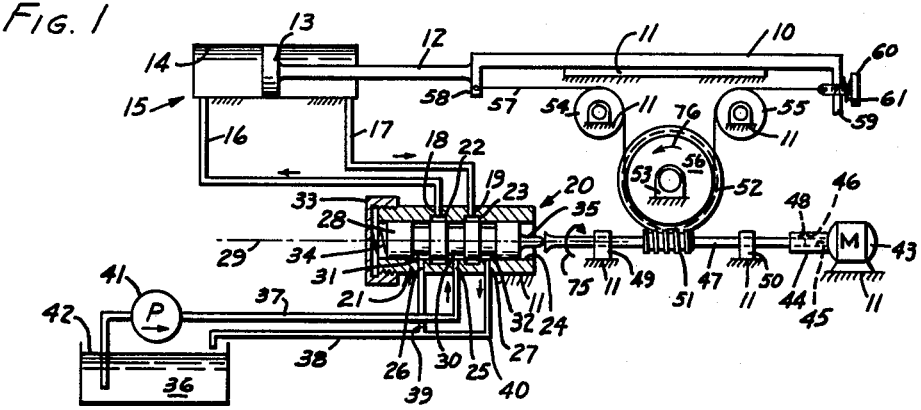
Fig. 1 is a side elevation partly in cross-section and partly in schematic notation showing an embodiment of this invention.

In Fig. 1, there is shown a machine tool installation in which a work table 10 is slidably mounted on a bed 11. Bed 11 is indicated as a foundation, and the foundation shading throughout the drawings indicates that the objects adjacent thereto are themselves mounted to the bed. The worktable is connected to a rod 12 which rod is attached to a piston 13. The piston 13 is disposed inside a cylinder 14, the piston and cylinder comprising a fluid motor 15. As shown, the cylinder is mounted to the bed of the machine so that shifting of the piston within the cylinder causes the worktable to move relative to the bed.

A pair of conduits 16, 17 are connected at one of their ends to the cylinder on opposite sides of the piston, so as to supply working fluid to the fluid motor. At their other ends, the conduits are attached to ports 18, 19 of a servo valve 20. This servo valve is a typical spool valve that includes a sleeve 21 with a pair of motor supply grooves 22, 23 in the wall of a spool passage 24 therein that communicate with ports 18, 19, respectively. The sleeve is pierced by a pressure port 25 and a pair of exhaust ports 26, 27. The exhaust ports are disposed one on each side of the pressure port.

Within the spool passage, there is disposed a spool 28. The spool and spool passage are both generally circular cylindrical in shape and have a common axis 29. The spool has three peripheral grooves thereon, a central pressure groove 30, which is always in communication with pressure port 25, and a pair of exhaust grooves 31, 32 which are disposed one on each side of the pressure groove, which are always in connection with exhaust ports 26 and 27 respectively. One of ports 26 and 27 may selectively be brought into communication with one of motor supply grooves 22 and 23, respectively, through one of spool grooves 31 and 32, respectively, while the other of said ports is brought into communication with pressure port 25 through pressure groove 30. This provides for a pair of operative control positions, one lying on each side of an intermediate null control position. The intermediate null control position is illustrated, wherein the motor supply grooves are cut off from all supply and exhaust connections.

The left hand end of the spool passage 24 is closed by a cap 33, which cap holds a bias spring 34 against the left hand end of the spool. The right hand end of the spool has a pin 35 which projects out from the spool passage.

A reservoir 36 is connected by conduit 37 to the pressure port 25 of the servo valve. Conduit 38, which discharges into said reservoir has two branches 39, 40. These branches respectively connect with exhaust ports 26, 27. A pump 41 is connected in conduit 37 for supplying hydraulic fluid under pressure to the pressure port. Fluid contained in the reservoir is indicated by numeral 42.

A signal motor 43 is mounted to the bed. It has a shaft 44 which is turned through rotational increments which are proportional to the desired axial shift between the machine tool elements. The shaft has a passage 45 therein, and a key slot 46 in the wall of said passage. A signal shaft 47 having a key 48 thereon fits into the passage 45 with the key in the key slot, so that the signal shaft is constrained to rotate with the motor shaft 44 and can slide axially relative to the servo valve in a direction parallel to the axis 29. A pair of bearings 49, 50 support the signal shaft relative to the bed for movement in this manner.

The signal shaft carries a worm 51 which worm is essentially an advancing screw thread. The worm 51 engages a worm gear 52 which has conventional worm gear teeth. The worm gear is rotatably mounted to the bed by journal 53. It will be seen that rotation of the worm gear will shift the signal shaft axially while, if the worm gear is held stationary, rotation of the signal shaft will cause the shaft to shift along its own axis.

A pair of idler wheels 54, 55 are journaled to the bed and are spaced above and to each side of a drum 56, which drum is integral with the worm gear structure so as to drive the worm gear, and be driven by it.

A flexible tape 57 is attached to two skirts 58, 59 on the worktable. The flexible tape is directly attached to skirt 58, while a headed pin 60 passes through skirt 59, and the flexible tape is attached to the pin. A compression spring 61 is placed between the head of the pin in the skirt, so as to keep the flexible tape in tension. The flexible tape winds over the idler wheels 54 and 55 and under the drum 56, so that shifting of the worktable causes the idler wheels, the drum, and the worm gear to rotate.

Figure 2:
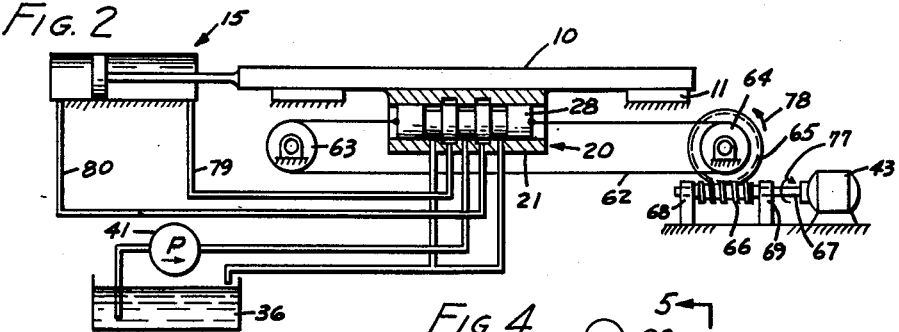
Figs. 2 and 3 are side elevations, partly in cut-away cross-section and partly in schematic notation, showing other embodiments of the invention.

Fig. 2 illustrates another embodiment of the invention. Because this embodiment incorporates many parts which are identical to those in Fig. 1, identical reference numbers will be used as much as possible. There are a worktable 10 and a bed 11, along with a fluid motor 15 that includes a cylinder and a piston, a servo valve 20, reservoir 36, pump 41, and conduits identical with those of Fig. 1.

However, in Fig. 2, the sleeve 21 of the servo valve is mounted to the worktable so as to shift therewith, and the valve spool 28 is connected at its opposite ends to a flexible tape 62 so as to complete a loop of said tape. Said loop of tape winds over a pair of drums 63, 64 which are mounted to the bed, so that the spool is shifted when the drums are rotated. Integral with drum 64, there is a worm gear 65, and this worm gear meshes with a worm 66 on a signal shaft 67. This signal shaft is mounted by a pair of journals 68, 69 to the bed, so that the signal shaft can be rotated but is not axially shiftable. A signal motor 43 turns the signal shaft.

Figure 3:
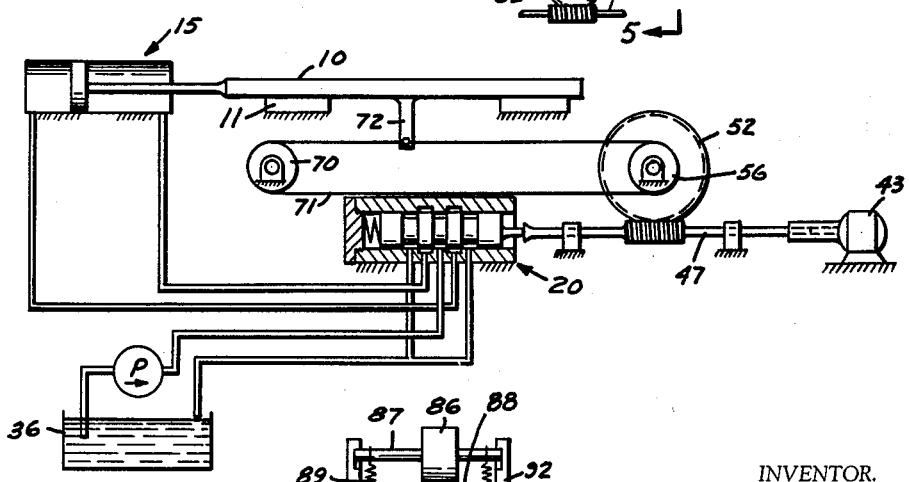

Fig. 3 shows still another embodiment, and as in the case of Fig. 2, like numerals will be used to show elements common to the embodiment of Fig. 1. There are a worktable 10, a bed 11, fluid motor 15, servo motor 20, reservoir 36, and associated conduits to the servo valve and the fluid motor. There is also a signal motor 43 with a signal shaft which is similar in all respects to that of Fig. 1 which is mounted identically as signal shaft 47 is mounted in Fig. 1. A worm gear 52 with an integral drum 56 is also provided.

In addition, there is a second drum 70 which is mounted to the bed, and a loop of flexible tape 71 wound around the drums 70 and 56. To this loop is attached a skirt 72 from the worktable so that if the worktable is shifted back and forth, the loop is pulled so as to rotate drum 56 and its integral worm gear.

Figure 4:
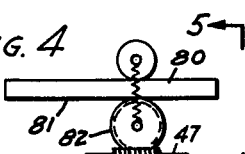
Fig. 4 is a fragmentary elevation showing the presently-preferred embodiment of the invention.

In Fig. 4, there is shown the presently preferred embodiment of a linkage between the worktable and the bed. An elongated rail 80 having a lower planar surface 81, which surface is smooth and continuous, is attached to the worktable so as to move therewith. The surface 81 is contacted by a drum 82 in non-slip relationship. This drum has a smooth circular cylinder section 83 and an integral worm gear section 84. A shaft 85 supports the drum 83.

A second drum 86 has a shaft 87 and bears against an upper surface 88 of the rail. Spring means 89 at opposite sides of the drums pull the shafts 85 and 87 toward each other, so as to tend to load the cylindrical surface 83 firmly against the planar surface 81 of the rail. To permit this loading action to take place, shafts 85 and 87 are mounted in stanchions 91, 92 and are capable of a small amount of vertical play therein. The stanchions are mounted to the bed of the machine.

It will be observed that the rail is linked through surface 81 and 83 to the worm on the signal shaft 47.

The operation of the embodiment of Fig. 1 will now be described. When it is desired to move the worktable through some increment of distance, the signal motor will be energized to turn the signal shaft through an angle which is proportional to the desired relative shift of the elements. This in turn causes the worm to move axially relative to the worm gear, because the worm gear is held still by its engagement to the worktable through the flexible tape. The resultant shifting of the signal shaft moves the spool away from the null position illustrated in Fig. 1 so that the servo-valve assumes one of its two operational control positions.

For example, assume that the signal shaft is turned in the direction indicated by arrow 75 in Fig. 1. This shifts the spool to the left so that the pressure groove on the spool will be in fluid communication with the conduit 16. This causes the piston to move to the right and the fluid from the right hand end of the cylinder is exhausted through conduit 17 back into cylinder supply groove 23, out branch 40, and through conduit 38 to the reservoir. This fluid movement causes the worktable to move to the right. The worktable movement carries the tape to the right and rotates the drum 56 counter-clockwise as shown by arrow 76. In turn, this causes the worm gear 52 to move counter-clockwise, and thereby shifts the signal shaft to the right in Fig. 1, thereby restoring the signal shaft to its original position. The bias spring 34 returns the spool to its null position as indicated in Fig. 1. Now until there is a further rotation of the signal shaft to move the servo valve to an operational position, no further power will pass through the valve to the motor to move the worktable relative to the bed and the system is in equilibrium.

Reverse rotation of the signal shaft backs the shaft away from the servo valve. The bias spring moves the spool to the right to operational position, and pressurized fluid shifts the piston to the left. Left hand movement of the tape restores the signal shaft to its central position, and this returns the servo valve to its null position.

In Fig. 2, the motor shaft is rotated to turn the worm. When the motor is turned in the sense of arrow 77, the worm gear 65 and its drum are turned counter-clockwise as indicated by arrow 78. This causes the flexible tape to move so as to shift the spool in the servo valve to the left, which in turn causes fluid pressure to proceed from the pressure port through conduit 79 to the right hand side of the fluid motor. This causes the piston to move to the left, and the fluid flows out of the left hand end of the cylinder, through conduit 80 to the servo valve, and thence to the reservoir. This movement causes the sleeve of the servo valve to "chase" the spool until the spool and the sleeve are again in the null relationship as shown in Fig. 2. At this time, fluid supply to the fluid motor is cut off by the servo valve, and the system is again in equilibrium until the signal shaft is again turned. Reverse rotation of the signal shaft results in movement of the machine tool elements in the opposite direction.

In Fig. 3, to shift the machine tool elements, the signal motor and signal shaft are turned so that the interengagement of the worm and the worm gear causes the signal shaft to shift axially as in the case of Fig. 1, and the resultant fluid connections to the fluid motor are the same as those described in connection with Fig. 1. Resulting movement of the worktable causes the flexible tape to be pulled along because of its engagement to skirt 72. This travel of the flexible tape causes the drum 56 to be rotated, which turns the worm gear 52 so as to restore the signal shaft to its original position, and the servo valve to its null position.

The drum 82 may be directly substituted for the drum 56 in Fig. 1, and the rail 80 may be substituted directly for the flexible tape 57 in the same figures. Idler wheels 54 and 55 will be dispensed with. With the above substitutions, the device of Figs. 4 and 5 may be combined with that of Fig. 1 to produce an operable numerically controlled device. It will also be necessary, in order to provide for the correct relative movement of the parts, to reverse the connections of conduits 16 and 17, so that conduit 16 connects with the right hand end of the cylinder in Fig. 1 and conduit 17 connects with the left hand end. The device of Figs. 4 and 5, wherein a heavy rail is used, provides a continuous element in the feed-back loop which is resistant to stretching by tensile forces. It has been found that when thin flexible tape is used, the forces exerted between the drums and the machine tool elements are sometimes sufficient to cause the flexible tape to stretch a bit. The aberrations which are caused by this stretch are tolerable for all but the more precise work. However, for more precise work, it is ordinarily preferred to utilize the heavy rail construction of Fig. 4, which rail construction has such a large cross-section that it does not permit substantial elongation under normal forces of operation. It will also be recognized that instead of providing a separate rail as shown, the rail could have been provided as a flange on the worktable or on the bed. In either event, an accurately flat surface can be ground with a surface grinder at a very low price, particularly as compared with the expense of manufacturing accurate screw threads for lead screws or the like.

The flexible tape shown in all of the embodiments which utilize it may be simple feeler stock of perhaps 0.005" thickness. This tape can be bought in rolls at a very low price. The low price of this part of the feed-back system is to be contrasted with the hundreds of dollars which an accurately manufactured lead screw of practical length, such as 5 feet, costs.

It will be observed that the servo valve shown herein is made of two parts, a spool and a sleeve, and that these parts are movable relative to each other so that they have a central null position (shown in the drawings) and an operative control position on either side of said null position as described hereinabove. The valve is caused to move to an operative control position as a consequence of rotation of the signal shaft.

Figure 5:
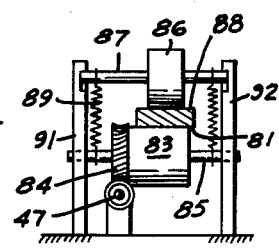
Fig. 5 is a cross-section taken at line 5—5 of Fig. 4.

All of the embodiments shown have in common an engagement in the feed-back loop between two continuous surfaces. In Figs. 1–3 the engagement is between a smooth cylindrical drum and an elongated tape. In Figs. 4 and 5 the engagement is between a smooth cylindrical drum and a flat surface.

The term "linked" as used herein means a mechanical interconnection which may be frictional, abutment, meshing, or the like in which when one of said linked elements moves, the other linked element necessarily moves proportionally and simultaneously.

It will be observed that the machine tool being controlled by this system will move the desired increment of distance regardless of the temperature of the machine tool. This is because there are no discrete points of engagement between the continuous surfaces and the drums. On the contrary, the engagement between the drum and the surface is a continuous one, and capable of infinitesimal adjustment. This contrasts with the engagement between gear teeth and a rack as previously used, wherein expansion of the rack or other toothed mechanism meshed with a gear is moved by a given number of teeth for a given angular movement of the gear. This means that if the gear teeth spread apart because of thermal expansion, the distance the elements move is wrong by the expansion increment. That condition does not pertain here, and this system is substantially free from temperature disturbances.

This invention is not to be limited by the embodiment shown in the drawings and described in the description, which are given by way of example and not of limitation, but only in accordance with the scope of the appended claims.

I claim:

1. A feedback system for governing relative movement of two elements of a machine tool adapted to be moved relatively by a fluid motor, comprising: a rotatable and axially shiftable signal shaft adapted to be rotated in angular increments which are proportional to the desired relative movement of the elements; a worm on said signal shaft; a servo valve comprising two cooperating parts, said parts being movable relative to one another to provide a null control position and two operative control positions, one on each side of the null control position, said servo valve being adapted to control the flow of fluid under pressure to the fluid motor for moving the elements relative to each other; a flexible tape having two ends, both of said ends being attached to the first of said elements, a drum mounted to the other of said elements, said drum being in frictional engagement with the said tape whereby said drum is rotated by the tape as the machine tool elements are relatively shifted, a worm gear rotated by said drum and meshing with the worm, the tape turning the drum, and the drum thereby turning the worm gear as the elements shift relative to each other, one of said valve parts being mounted to the second of said elements, and the other valve part being linked to the signal shaft so as to be moved by axial shifting of the signal shaft, whereby the relative position of the valve parts is adjustable by rotation of the signal shaft and of the drum to assume the null and control positions, and whereby rotating the worm moves the valve parts to one of their control positions, the valve passing fluid to said motor to relatively move said elements, resulting movement of the elements rotating the drum and tending to restore the valve parts to their null control position.

2. Apparatus according to claim 1 in which a first of said parts of said servo valve comprises a sleeve having a spool passage therein, and in which the second of said parts comprises a spool in said passage which is axially slidable therein; a pair of motor supply grooves in said spool passage adapted to be connected to said motor for supplying fluid under pressure thereto; a pressure inlet port in said sleeve connecting with the spool passage, said pressure inlet port being disposed between the two motor supply grooves; a pair of exhaust ports through said sleeve connecting with the spool passage on the opposite sides of said pair of motor supply grooves, said pressure inlet port being adapted to be connected to a reservoir, said spool having a central pressure groove which is in fluid communication with said pressure inlet port and a pair of exhaust grooves, one of said exhaust grooves being on each side of said pressure groove, and each of said exhaust grooves being in fluid communication with ont of said exhaust ports; said signal shaft engaging the said spool, whereby axial shifting of the signal shaft shifts the spool within the spool passage so as to bring the pressure groove into communication with one of the motor supply grooves and to bring the other of said motor supply grooves into fluid communication with one of the exhaust grooves to provide an operative control position, said null control position being restored when the pressure groove does not make substantial fluid communication with either of the motor supply grooves.

3. A feed-back system for governing the relative movement of two elements of a machine tool along an axis, comprising: a rotatable signal shaft which is adapted to be rotated in angular increments that are proportional to the desired relative movement of the elements; a worm on said signal shaft; a servo valve linked to said signal shaft and comprising two cooperating parts, said parts being movable relative to one another to provide a null control position and two operative control positions, one on each side of the null control position, said valve being adapted to control the flow of fluid under pressure to a fluid motor, which motor relatively moves said elements; a pair of drums mounted to one of said elements, said servo valve and signal shaft being mounted to the same element; a worm gear in operative connection with one of said drums and meshing with said worm; a loop of flexible tape around said two drums, said loop being connected to the other of said elements, so that the tape is moved as a consequence of relative movement of the two elements, whereby when the signal shaft is rotated the engagement between the worm and the worm gear causes the signal shaft to move axially so as to shift the sleeve within said spool so as to place the servo valve in one of its operative control positions, thereby causing fluid under pressure to flow to said fluid motor and relatively shift the elements, said relative movement between the elements causing the loop of tape to move thereby turning said drum and worm gear which tends to restore the signal shaft to a position such that the servo valve returns to a null central position.

4. A feed-back system for governing relative movement of two elements of a machine tool, comprising: a rotatable signal shaft which is adapted to be rotated in angular increments that are proportional to the desired relative movement of the elements; a worm on said signal shaft; a worm gear meshing with said worm; a servo valve comprising two cooperating parts, said parts being movable relative to one another, so as to provide a null control position, and two operative control positions, one on each side of said null control position, said valve being adapted to conrtol the flow of fluid under pressure to a fluid motor, which motor relatively moves said elements; a continuous surface carried by one of said elements; a drum carried by the other of said elements, said drum being in non-slip rolling contact with said surface, said worm gear and drum being connected for simultaneous rotation, one of the valve parts being linked to said signal shaft, and the other of said valve parts being linked to one of said elements, whereby the relative position of the valve parts to assume the null and control positions is adjustable by rotation of the signal shaft and of the drum and whereby rotating the said worm moves the valve parts to one of their control positions, the valve passing fluid to said motor to relatively move said elements, resulting movement of the elements rotating the drum and tending to restore the valve parts to their null control position.

5. Apparatus according to claim 4 in which the surface is on a first of said elements, and in which a first of said valve parts is mounted to the second of said elements, the second of said valve parts being linked to said surface through the worm, worm gear, and drum.

References Cited in the file of this patent
UNITED STATES PATENTS

| | | |
|---|---|---|
| 1,961,343 | Donaldson | June 5, 1934 |
| 2,175,800 | Hodgman | Oct. 10, 1939 |
| 2,210,916 | Kenyon et al. | Aug. 13, 1940 |
| 2,311,010 | Vickers | Feb. 16, 1943 |
| 2,527,458 | Schurr | Oct. 24, 1950 |
| 2,570,624 | Wyckoff | Oct. 9, 1951 |
| 2,579,566 | Godfriaux | Dec. 25, 1951 |
| 2,601,157 | Le Lan | June 17, 1952 |
| 2,761,285 | Beecroft | Sept. 4, 1956 |

UNITED STATES PATENT OFFICE
CERTIFICATE OF CORRECTION

Patent No. 2,960,071 November 15, 1960

Roy Rosebrook

It is hereby certified that error appears in the above numbered patent requiring correction and that the said Letters Patent should read as corrected below.

Column 3, line 60, for "56." read -- 56, --; column 7, line 28, for "ont" read -- one --.

Signed and sealed this 26th day of September 1961.

(SEAL)
Attest:

ERNEST W. SWIDER
Attesting Officer

DAVID L. LADD
Commissioner of Patents
USCOMM-DC